United States Patent [19]
Neoh

[11] Patent Number: 5,909,382
[45] Date of Patent: *Jun. 1, 1999

[54] TABLET WITH SYSTEM POWER SAVING FEATURES INCLUDING REACTIVATION BY PENCONTACT AFTER INACTIVE PERIOD

[75] Inventor: Chong Lim Neoh, Belle Vue, Singapore

[73] Assignee: Tritech Microelectronics International Ltd., Singapore, Singapore

[*] Notice: This patent is subject to a terminal disclaimer.

[21] Appl. No.: 08/734,221

[22] Filed: Oct. 21, 1996

Related U.S. Application Data

[63] Continuation-in-part of application No. 08/355,492, Dec. 14, 1994, Pat. No. 5,568,409.

[51] Int. Cl.$^6$ .................................................. G08C 21/00
[52] U.S. Cl. ............................... 364/709.11; 395/750.03; 178/19.01
[58] Field of Search ............................... 364/707, 709.08, 364/709.11; 178/18, 19, 20; 345/173; 395/750.03, 750.05, 750.06, 750.07

[56] References Cited

U.S. PATENT DOCUMENTS

| | | | |
|---|---|---|---|
| 5,266,750 | 11/1993 | Yatsuzuka | 178/19 |
| 5,324,895 | 6/1994 | Inamori et al. | 178/18 |
| 5,384,721 | 1/1995 | Joto | 364/707 |
| 5,396,443 | 3/1995 | Mese et al. | 364/707 |
| 5,416,726 | 5/1995 | Garcia-Duarte et al. | 364/707 |
| 5,423,045 | 6/1995 | Kannan et al. | 364/707 |
| 5,568,409 | 10/1996 | Neoh | 364/707 |

*Primary Examiner*—Chuong Dinh Ngo
*Attorney, Agent, or Firm*—George O. Saile; Stephen B. Ackerman

[57] ABSTRACT

A digitizing tablet has an improved operation for saving power. After an input device contacts the tablet surface, resistive sheets provide analog pen position signals to a sample/track and hold circuit. Once the signals are captured by the sample/track and hold, power is removed from the resistive sheets and digitization of the analog signals is performed. During an input waiting period, power is further conserved by removing power from the sample/track and hold and analog-to-digital converter, as a separate level detect circuit detects contact with the tablet surface by an input device.

14 Claims, 5 Drawing Sheets

TABLET WITH SYSTEM POWER SAVING FEATURES INCLUDING REACTIVATION BY PENCONTACT AFTER INACTIVE PERIOD

This application is a Continuation-in-Part of application number 08/355,492, filed Dec. 14, 1994, now U.S. Pat. No. 5,568,409.

FIELD OF THE INVENTION

This invention relates to a tablet (a graphics input device) for a data processing system and more specifically to a resistive sheet tablet with a power saving system.

INTRODUCTION

Resistive tablets are well known, but it will be helpful to review the features and terminology that particularly apply to this invention. A tablet presents a flat surface to a user and the user holds an object called a pen or a stylus against the tablet surface, for example to point to a selected area or to write in script. Tablets can be held or mounted in various positions, but they are frequently arranged in a vertical plane over the surface of a display (such as a CRT) and it will be convenient to use this orientation for describing a tablet.

When the pen contacts the tablet surface, an electrical circuit is established at the contact point, and a signal is produced that can be interpreted as the position of the pen in a two-dimensional coordinate system on the tablet surface. Ordinarily, the tablet has separate components for the x dimension and the y dimension.

The tablets to which this invention applies have two superimposed resistive sheets, one sheet for the x dimension and one sheet for the y dimension. The components for each sheet are similar except for their orientation to form the two axes of the coordinate system. The x dimension sheet has two vertical electrodes that are horizontally spaced apart, one along each end of the sheet. Switches connect these electrodes across a voltage source so that a current flows horizontally across the sheet.

The resulting voltage drop in the resistive sheet produces a voltage ramp horizontally across this sheet: the voltage is low on one side and high on the other and it varies across the surface of the sheet smoothly as a function of position.

Thus, when the two x dimension electrodes are energized, each point on the x dimension sheet has a voltage that corresponds to the x dimension of the point. The electrodes at the ends of the sheet have a low resistance, and the voltage is uniform in their vertical direction. consequently the gradient across the sheet is uniform vertically and the x position signal is independent of the y dimension of the pen position.

Similarly, the y dimension sheet has two horizontal electrodes, one at the top and one at the bottom, and a current in these electrodes produces a vertical voltage ramp across this sheet. When the y dimension electrodes are energized, each point on the y dimension sheet has a voltage that corresponds to the y dimension of the point.

In the operation of the tablet, the two sheets are energized alternately and it will be convenient to analyze the tablet operation as having a repeating sequence of two phases, an x dimension phase and a y dimension phase or more generally, $\phi 1$ and $\phi 2$ to emphasize their similarity. The pen position in the x dimension is detected during one phase and the pen position in the y dimension is detected during the other phase.

Each sheet has two switches, one for each electrode. During $\phi 1$, the two switches for one sheet are closed to connect this sheet across the two terminals of a power supply. This connection establishes the current in the sheet and the resulting voltage ramp across the sheet. During $\phi 1$, the switches of the other sheet are both opened and this sheet is electrically isolated from the power supply. The switch positions are reversed for $\phi 2$.

The outermost sheet can be depressed by a pen so that the depressed point on the outer sheet contacts the other sheet. When this happens during a particular phase of the switching operation, the electrically isolated sheet comes to the potential of the point of contact with the energized sheet. The voltage of this point is from the voltage ramp and it is detected and converted to a value representing the position in the dimension for which the sheet is energized. The alternating sequence of phases is fast enough to consider that the pen position does not change while the position signals are generated for both dimensions.

As the tablet has been described so far, the two sheets are energized in an alternating sequence regardless of whether the pen is positioned on the tablet surface and the pen position is being detected or the tablet is momentarily not being used. It is a general object in the data processing arts to reduce the power a component uses while it is not being used.

A familiar and relevant example of power saving is a portable computer that darkens its screen after the user has been inactive for a preset time interval. This interval is ordinarily preset by the user. Saving power in this way is particularly useful in battery operated portable apparatus.

Similarly, in a tablet system the absence of a pen signal for a preset time can be used as a signal to stop the power consuming operation of driving current through the resistive sheets.

THE PRIOR ART

To understand power consumption in a resistive digitizer system, it is helpful to divide the tablet operation into two parts: the period of active digitizing and a wait period. The prior art (U.S. Pat. No. 5,266,750) enters a wait state when the tablet has been inactive for a preset time. The digitizer is turned off during the wait state. The tablet resumes the digitizing state when it detects that the pen has touched the tablet surface.

During the wait state of U.S. Pat. No. 5,266,750, each sheet is connected to one terminal of a voltage source and this circuit is completed when the pen touches any point on the active area of the tablet. The circuit does not require power until the user touches the tablet surface with a pen and current flows in the circuit of two sheets and their touching point.

One sheet is connected to ground through a resistor that converts the sheet current to a voltage that signals that pen activity has been resumed. The resistor is connected at the point where the analog pen position signal appears for one sheet, and the pen activity signal follows the normal path for the analog pen position voltage.

The other sheet is connected to a power supply terminal by a series diode that is poled in the direction to permit current to flow for signaling pen activity. When normal switching is resumed, the diode is given a reverse voltage that turns it off and thereby isolates it from the other components of the tablet.

SUMMARY OF THE INVENTION

One object of this invention is to provide a new and improved tablet system that has reduced system power consumption during both the digitizing period and the wait period. During the digitizing period, power is supplied to the resistive sheets and the analog to digital converter and other components that produce a digital signal, however, in a key aspect of the invention, power is applied to the resistive sheets only during the sample and hold period.

Power is dissipated by the resistive sheets as well as by the other circuitry. By this application of the sample and hold operation, power is only dissipated in the resistive sheet for a fraction of the digitizing period.

In one embodiment, the system returns to the digitizing operation after a suitable delay during which the calculations can be made and the pen position may have changed by an amount that is related to the resolution of the tablet system. In this embodiment, the system switches to a wait state after a predetermined period of pen inactivity, and power is removed during the wait state. In an alternative embodiment, the system switches to the wait state after each pen position determining operation.

Another object of this invention is to provide a new and improved circuit that requires less power for detecting that a pen has been put in contact with the tablet surface during a wait period.

A more specific object of the invention is to better isolate the pen detection components from the normal switching components of the circuit. By having independent contact detect circuitry, the unused portion of the system, (e.g. analog to digital converter) can be powered down during input waiting. There may be instances where by pipelining the digitizing happens concurrently with the digital processing and the components are powered at appropriate times.

In the improved circuit of this invention, a current sensing resistor is located in the power supply end of the circuit. This circuit has the advantage that the resistor is out of the path for processing the normal analog pen position signal. Only leakage current flows when the logic is implemented using CMOS.

This circuit provides a set of switches and timing signals that operate the switches.

One advantage of this invention is that it can be implemented in a single chip with direct connections between the chip and the resistive sheets of the tablet and without external components in the path between the chip and the resistive sheets.

Other features and objects of the invention will appear in the description of the preferred embodiment.

DETAILED DESCRIPTION OF THE PREFERRED EMBODIMENT

Figure 3:
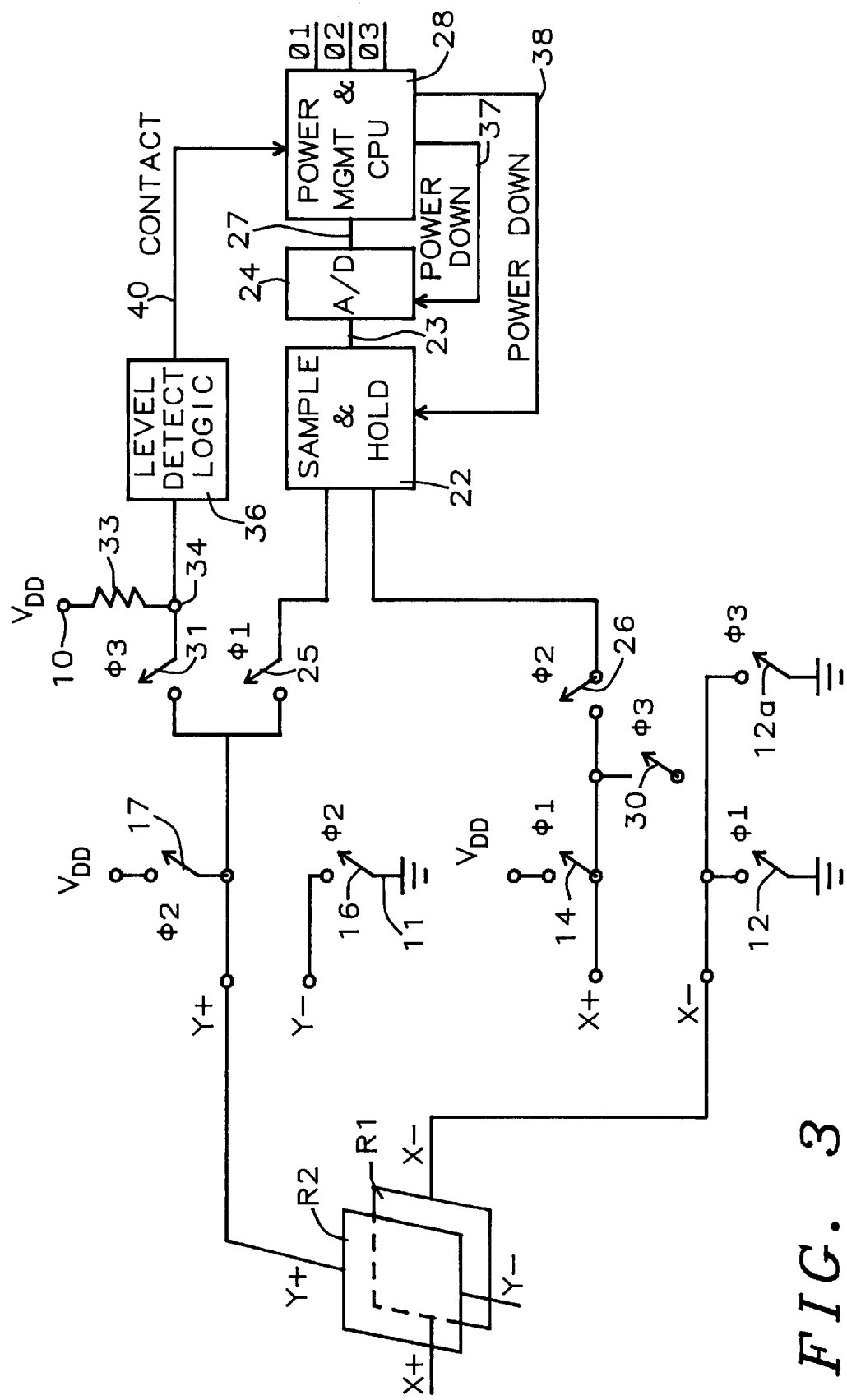
FIG. 3 is a diagram of a resistive tablet and a schematic drawing of the pen activity detector and the power control system of this invention.

Introduction - - - FIG. 3

The physical structure of the two resistive sheets is well known, and they are shown isometrically in a simplified form in FIG. 3. The overlying (upper) sheet is the y dimension sheet and the underlying (lower) sheet is the x dimension sheet. This designation of the dimensions is arbitrary and for generality the resistances will be called R1 and R2. The ends of the x dimension sheet are designated x+ and x−, and during some of the operations that will be described, end x+ is connected to a point of potential 10 an end x− is connected to ground. Similarly, the ends of the dimension sheet are called y+ and y− and are connectable to potential point 10 and ground.

The other components that will be described are preferably formed on a single chip. The chip has four connection points, x+, x−, y+ and y− where connections are made to the corresponding four edges of the resistive sheets. Ordinarily, these connections will be direct without intervening components. The connecting lines for points y+ and x− are shown in the drawing (and the connections for y and x+ are similar).

The Timing Signals

Figure 5:
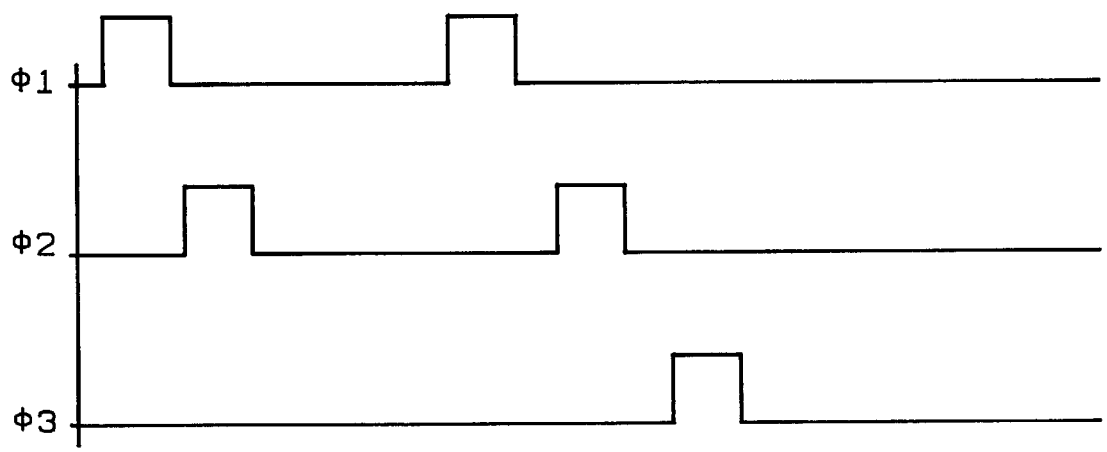
FIG. 5 is a timing diagram showing three phases of the operation of the tablet.

During operations to detect the pen position, the tablet operates with the timing signals φ1 and φ2 shown in FIG. 5. (The timing signal φ3 in FIG. 5 will be described later.) Both φ1 and φ2 signals for only a short duration, i.e., only long enough for the sample/track and hold. This reduces the time the resistive sheets are driven and therefore reduces power.

The time from the rise of the first of these signals (φ1) to the fall of the second (φ2) is a sample time. During one sample time, the tablet receives signals for detecting both coordinates of the pen position. The two timing signals φ1 and φ2 are non-overlapping and are close enough together and short enough in duration that the pen position does not change appreciably during the sample and hold time. During particular phases of the signals φ1 and φ2 and their complement (when both φ1 and φ2 are down), an operation takes place to save system power, as will be described later.

The Tablet System of FIG. 3 - - - Pen Position Detecting

One end of resistive sheet R1 is connected to ground 11 through a switch 12 and the other end is connected to voltage point 10 of the power supply, preferably 3 volts, through a switch 14. Voltage point 10 is designated VDD because the preferred embodiment uses FET circuits. Switches 12 and 14 are closed (conducting) during time φ1, as the legend in FIG. 3 shows, and they are opened (non-conducting) during time φ2. Switches 12 and 14 and other switches in FIG. 3 are preferably semiconductor transistors that are turned on and off by a signal φ1 or φ2 that is applied to a control terminal of the transistor. These switches are well known and are represented in FIG. 3 schematically and their controlling connections are represented by the timing signals.

Similarly, one end of resistive sheet R2 is connected to ground through a switch 16 and the other end is connected to voltage point 10 through a switch 17, Switches 16 and 17 are closed during time φ2 (as legends in FIG. 3 show) and they are opened during time φ1.

During time φ1, signal φ1 is high and switches 12 and 14 are closed and connect resistive sheet R1 across the voltage source and a voltage gradient appears across this resistive sheet. During φ1 time, switches 16 and 17 are open and resistive sheet R2 is isolated from ground and from voltage point 10 until a pen is positioned on the outer one of the two sheets and it is deformed at a point to establish electrical contact between the deformation and the corresponding point on the underlying resistive sheet.

Switches 25 and 26 connect the ungrounded ends (x+ and y+) of resistive sheets R1 and R2 respectively to a sample and hold circuit 22. This circuit conventionally receives the signal at it inputs and produces a corresponding sample at its output 23. Equivalently, switches 25 and 26 can be connected to a common node that is connected to sample and hold circuit 22 by a single line. During time φ1, switch 25 is closed to connect resistive sheet R2 to sample and hold circuit 22, and circuit 22 produces a signal for the X dimension. Similarly, during time φ2, switch 26 is closed to connect resistive sheet R1 to sample and hold circuit 22 and circuit 22 produces a sample for the Y dimension.

The term "sample and hold" for circuit 22 also refers to track and hold circuitry. A sample and hold circuit takes an instantaneous sample and holds it. often a practical circuit follows or tracks the input signal prior to holding.

A conventional analog to digital converter 24 receives the output of the sample and hold circuit and produces a corresponding multi-bit digital code at its output 27 for each sample. A processor 28 receives the digital code and processes it to produce a multi-bit code for the corresponding x or y dimension position at its output (conventional and not shown).

Processor 28 also produces the φ1, φ2 and φ3 timing signals, The lines connecting these timing signals to control the switches are not shown in the drawing but will be readily understood. The programming or equivalent circuits for producing these timing signals will be understood when these operations are described later. Processor 28 also produces signals Power Down to analog to digital converter 24 on a line 37 and to sample and hold circuit 22 on a line 38. The programming for producing these signals will be understood when these operations are described later. The processor may be used for other functions besides position computation. For example in a handheld computer it could be the host CPU of the computer as well.

The φ3 Timing Circuit and Operation

The following table (Table I) summarizes the switch operations for the position detect period (the four right-most columns) and for the waiting period, which will be described later. The organization of the table can be understood by considering the entries that describe the position detect operation.

TABLE 1

| | | | Position Detect Period | | |
|---|---|---|---|---|---|
| | Input Waiting | Sample & Hold X | A/D X | Sample & Hold Y | A/D Y |
| Switch Conditions | φ3 = on<br>φ1 = off<br>φ2 = off<br>A/D,<br>Sample &<br>Hold<br>powered<br>down | φ3 = off<br>φ1 = on<br>φ2 = off<br>A/D, S/H powered up | φ3 = off<br>φ1 = off<br>φ2 = off | φ3 = off<br>φ1 = off<br>φ2 = on | φ3 = off<br>φ1 = off<br>φ2 = off |

The position detect period is divided into a sample & hold time and an analog to digital converter time for each dimension. As already described, the φ3 switches are off during all phases of the position detect period. The φ1 switches are on for the sample and hold operation for the x dimension but are off during the operation of the analog to digital converter. Similarly, the φ2 switches are on for the sample and hold operation for the y dimension but are otherwise off during the position detect period.

Significant power savings result from the above operation. The pen position signal (in either the X or Y dimension) may be sampled and held in as little as a single clock cycle. Digitizing the analog signal (A/D X or A/D Y in Table 1) in a typical low-power application would take multiple clock cycles, as a successive approximation analog-to-digital converter would likely be used. By way of example, a 10-bit ADC may take 1 clock cycle per bit. During digitization, however, the φ1 and φ2 switches are off and thus the resistive sheets are not driven. So in this example, the resistive sheets are only driven during the 1 sample/hold clock cycle and are turned off during the 10 clock cycles of digitization, resulting in over 90% power reduction to the sheets (compared to a circuit in which power is continuously supplied to the resistive sheets).

The Input Waiting State

Processor 28 detects when there has been a preset period of pen inactivity. This general operation will be familiar from the practice of turning off a display screen to save the battery of a portable computer, and the programming or equivalent circuits for this function will be understood without a specific description, When this period of inactivity has been detected (or when some equivalent user action has taken place), the processor drops timing signals φ1 and φ2 and thereby opens the four switches 12, 14, 16, 17 that otherwise connect the resistive sheets R1 and R2 to voltage point 10. This operation saves the power that is otherwise used in the resistive sheets.

Figure 1:
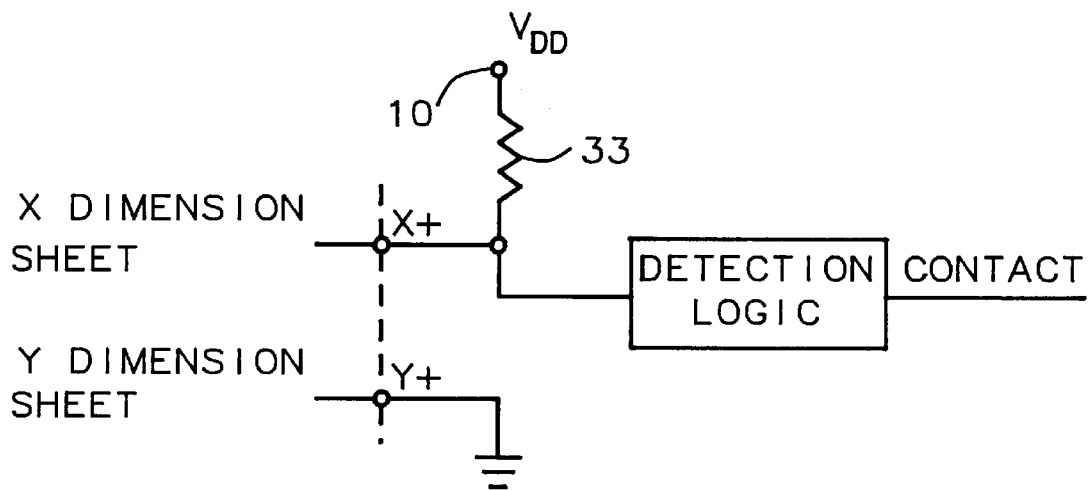
FIG. 1 is a diagram of the pen contact detector.
Figure 2:
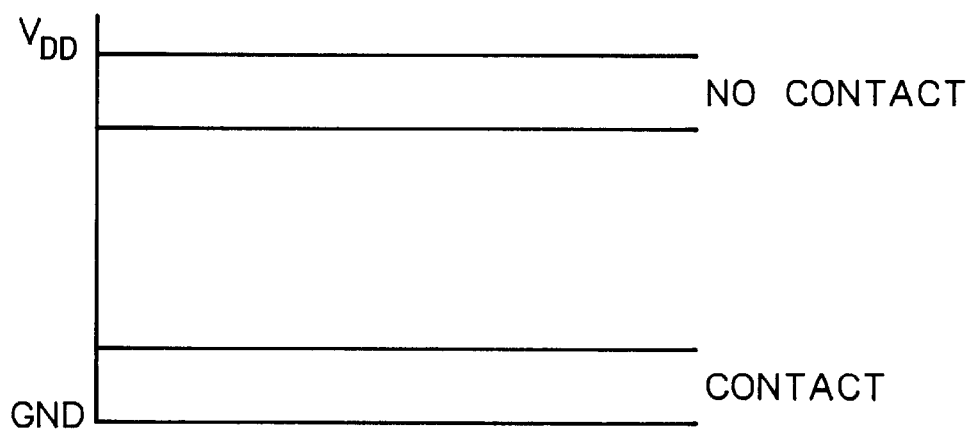
FIG. 2 is a diagram showing voltage margins that define pen contact.

FIG. 1 is a simplified diagram to introduce the pen contact detecting circuit. As will be explained more fully later, during the waiting state a resistor 33 is connected between VDD and x+, the non-grounded connection to resistive sheet R1. Point y+ (and preferably point y– also) is connected to ground. These connections are independent of the connections for pen position detecting. While there is no pen contact, the two sheets are not in contact and point x+ has the potential VDD of point 10. While the pen is positioned on the tablet surface, sheets R1 and R2 are in conductive contact and point x+ is pulled to ground by the voltage drop across resistor 33. In fact there is a voltage drop across resistors R1 and R2, and resistor 33 gives a much higher resistance so that substantially all of the voltage drop is across resistor 33. FIG. 2 shows that a voltage near ground is accepted as signaling pen contact and a voltage near VDD is accepted as signaling no pen contact. A voltage between these ranges does not occur during the wait state (unless a machine fault has occurred).

The Pen Contact Detecting Circuit - - - FIG. 3.

In a preferred embodiment, in response to timing signal φ3, a switch 12a is closed to connect one end of resistive sheet R1 to ground, as described for the pen position detecting operation at time φ1. (Switch 12a parallels switch 12 and may be implemented in the same structure.) A switch 30 is closed to connect the ungrounded end of resistive sheet R1 to ground. A switch 31 is closed and cooperates with a resistor 33 to connect resistive sheet R2 to the voltage point 10. The node at the interconnection of resistor 33 and switch 31 is designated 34. Until the pen contacts the tablet surface, the two sheets R1, R2 are separated and thereby interrupt the circuit of point 10 and resistor 33. During this part of φ3 time there is no voltage drop across resistor 33, and node 34 has the high voltage of point 10.

When the tablet user has placed the pen in contact with the tablet surface, resistive sheets R1 and R2 make electrical contact (at some arbitrary point) and complete a circuit from point 10, through resistor 33, switch 31, resistive sheet R2, the point of contact on resistive sheet R1, and in parallel paths through parts of resistive sheet R1 and switches 12 and 30 to ground.

A Level Detect Logic circuit 36 is connected to receive the voltage at node 34 and to produce a binary output on a line 40 that signals processor 28 that the two resistive sheets are in contact. Level Detect Logic circuit includes an amplifier that is biased to operate according to FIG. 2. The level detect logic circuit operates at low power as compared with the prior art, since by using logic detect only leakage current flows when the logic is implemented using CMOS. In addition, by having contact detect circuitry that is independent from the rest of the circuit, the unused portion, e.g., the A/D Converter, may be powered down during the Input Waiting period.

Figure 6:
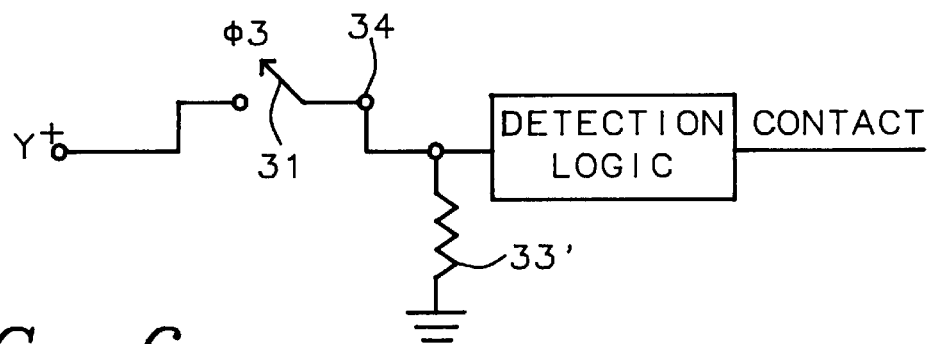
FIG. 6 is a schematic representation of a second embodiment for the pen contact detect circuit of the invention.
Figure 7:
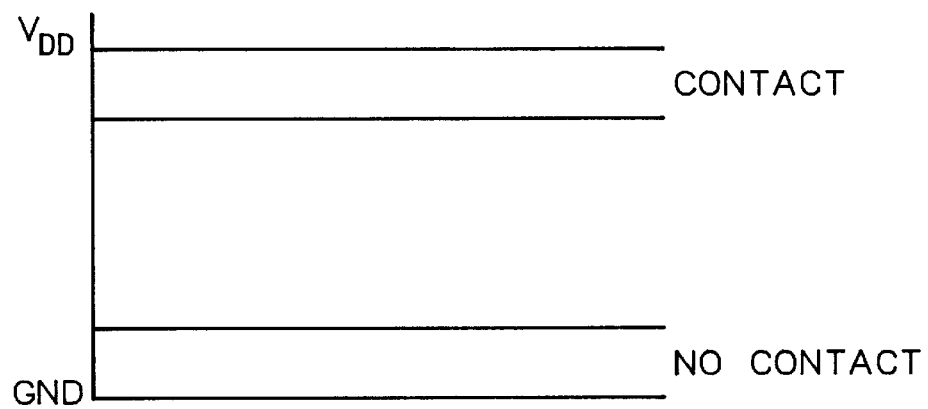
FIG. 7 is a diagram showing voltage margins that define pen contact for the second embodiment of the pen contact detect circuit.
Figure 8:
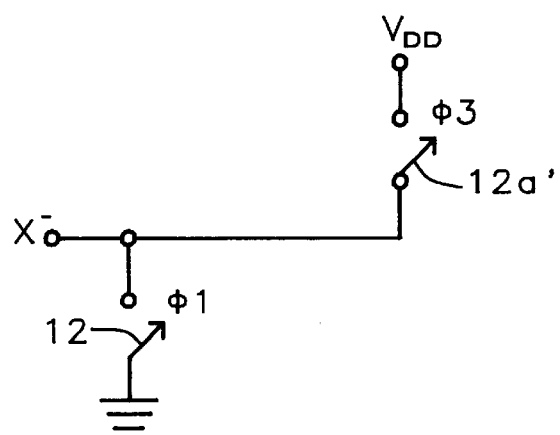
FIG. 8 is a schematic view of a change to the FIG. 3 circuit for the second embodiment of the pen contact detect circuit.

In an alternative embodiment, as depicted in FIGS. 6–8, the Level Detect Logic is implemented with inverted logic (as compared to the previous embodiment), so that when there is no pen contact and while timing signal φ3 is active, the voltage at node 34 is low (pulled down by resistor 33' which is connected to ground). In response to timing signal φ3, switches 31 and 12a' are closed, connecting one end of resistive sheet R2 to ground through resistor 33', and connecting one end of resistive sheet R1 to $V_{DD}$ through Switch 12a'.

When the tablet user places the pen in contact with the tablet surface, resistive sheets R1 and R2 make electrical contact and complete a circuit from ground, through resistor 33', switch 31, resistive sheet R2, the point of contact on resistive sheet R1, and in to VDD through switch 12a'. Thus a high level voltage is present at node 34, indicating pen contact has occurred. Operation of the circuit continues as follows.

In response to the signal 40, the CPU 28 drops signal φ3 (and thereby opens switches 30 and 31 and releases switch 12 to respond to its φ1 signal) and resumes the alternating sequence of signals φ1 and φ2, as already described.

Preferably, as FIG. 5 shows, the φ3 signal is down for most of its cycle and processor 28 operates on periodic samples of the pen signal on line 40.

Timing for Power Saving

Power is supplied to sample and hold circuit 22 and the analog to digital converter 24 only during the Position Detect Period. When the processor starts the wait period, it puts binary signals on lines 37 and 38 to turn off the power to these circuits. When the processor detects pen activity, it places signals on lines 37 and 38 to restore power to sample and hold circuit 22 and analog to digital converter 24.

Figure 4:
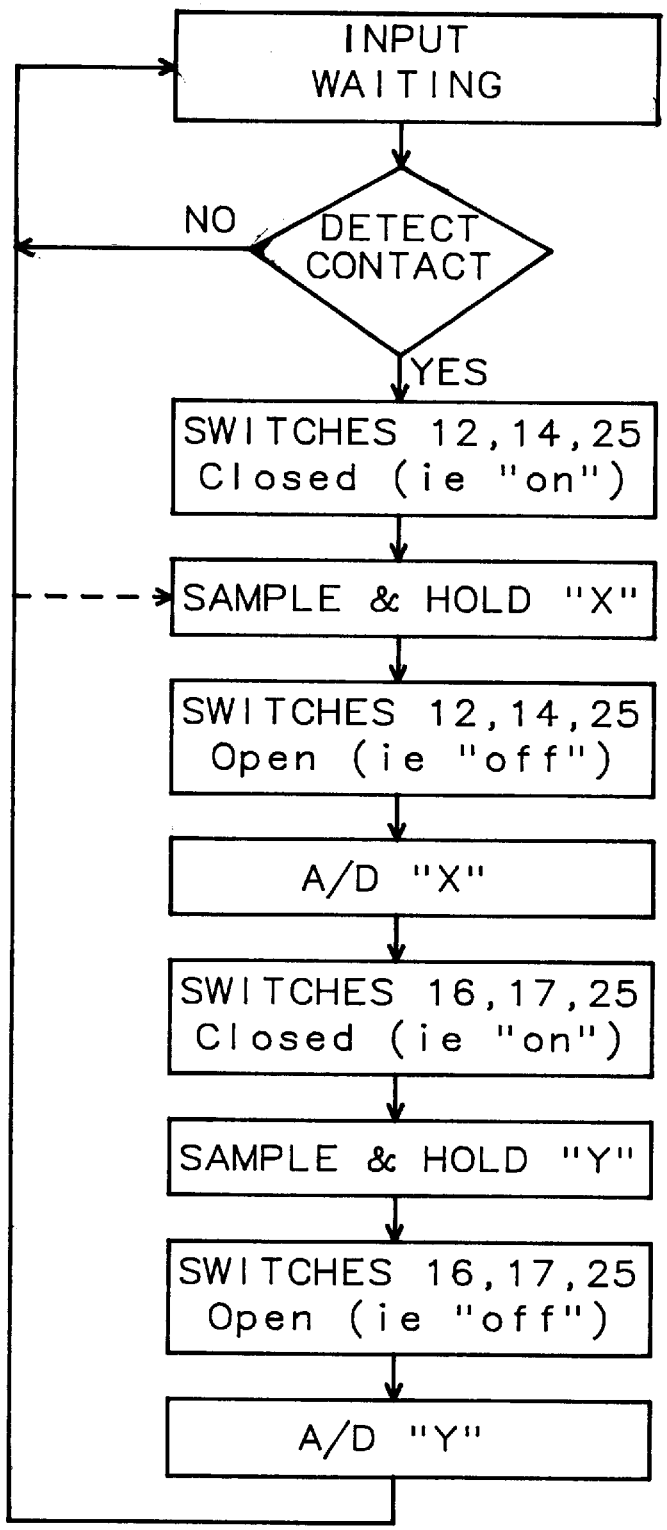
FIG. 4 is a flow chart that describes the operation of the invention.

This sequence is shown in FIG. 4. The process as shown in the diagram starts in the wait state. When contact is detected, the processor controls the system to execute the phases of the pen detect operation. At the end of this operation (the last box in the diagram), the process can return to the wait state as shown by the solid line or it can go to a sample and hold operation, as shown by the dashed line, depending on the power management logic.

In the embodiment of the invention represented in FIG. 4 by the dashed line, the φ1 and φ2 signals are produced at a selected rate until processor 28 detects a time-out and starts a wait state. As can be seen, the switches controlled by the φ1 and φ2 signals are on (and thus the resistive sheets are driven) only long enough to sample/hold the X or Y pen position signals. Digitization (A/D X or A/D Y) then takes place without the tablet being driven, thus saving power.

In this embodiment, the φ1 and φ2 pulses are spaced apart at least long enough to perform these calculations and may be spaced apart longer to correspond to the motion of the pen for a minimum distance that the system is intended to detect.

In the embodiment of the invention represented in FIG. 4 by the solid line, processor 28 produces one pair of pulses φ1 and φ2 and the system processes these signals and the processor then begins a wait state. When pen contact is detected, the timing circuit produces another pair of these pulses. Variations of these two embodiments with more than one sample and hold cycle will be readily understood.

Other Embodiments

The resistive sheets have been designated X and Y for convenience, and the connections to one dimension or the other is an arbitrary choice. Similarly, the connections can be made to the outer resistive sheet or the underlying sheet.

From the description of a preferred embodiment of the invention, those skilled in the art will recognize differing implementations within the spirit of the invention and the intended scope of the claims.

What is claimed is:

1. A circuit for a digitizing tablet, comprising:

a voltage source having a first terminal (10) and a second terminal (11), the second terminal being a ground reference;

a first (R1) and a second (R2) resistive sheet, one sheet being outermost and the other being underlying;

switching means (12, 14, 16, 17) operable during normal tablet operation for connecting the resistive sheets across the voltage source one at a time for producing an analog voltage in an X dimension of the first sheet while maintaining the second sheet electrically floating during a first phase, and producing an analog voltage in a Y dimension across the second sheet while maintaining the first sheet electrically floating in a second phase, and wherein the outermost sheet is deformable at a point of contact with a pen whereby the analog voltage at the point of contact of the connected sheet is applied to the floating sheet;

signal processing means (22, 24, 28) for converting the analog voltage to a digital code representing a pen position;

means (25, 26) for connecting the signal processing means (22, 24, 28) to receive the analog voltage of each floating sheet separately;

means in the signal processing means for producing timing signals for controlling the switching means;

means in the signal processing means for capturing the analog voltage produced by each resistive sheet;

means in the signal processing means for digitizing the analog voltage; and means for discontinuing operation of the switching means after said analog voltage is captured by said capturing means and before said analog voltage is digitized by said digitizing means, whereby power is saved by not applying power to said resistive sheets while said analog signal is being digitized and until a next pen position is to be detected.

2. The circuit of claim 1 wherein the signal processing means comprises a capturing means (22), an analog to digital converter (24) connected to receive an output of the capturing means (22), and a processor (28) connected to receive the output of the analog to digital converter.

3. The circuit of claim 2 wherein said capturing means comprises a sample and hold circuit.

4. The circuit of claim 2 wherein said capturing means comprises a track and hold circuit.

5. The circuit of claim 2 including means in the processor to turn off power to the capturing means and the analog to digital converter after a period of pen inactivity and to turn on power to the sample and hold circuit and the analog to digital converter when restarting normal tablet operation.

6. The circuit of claim 1, further comprising:

a switch means (31) for connecting the second terminal of the voltage source to one of the sheets (R2) and a second switch means (12a') for connecting the first terminal of the voltage source to the other one of the sheets, whereby pen contact produces a current through the sheets signaling that pen activity has resumed; and means (33', 36) for detecting the current through the sheets and for producing a signal on the occurrence of the current, said detecting means being independent of the signal processing means and the means (25, 26) correcting the signal processing means (22) to receive the analog voltage.

7. The circuit of claim 6 wherein the means for detecting current includes a resistor (33) connected to conduct in series with the two sheets when the outermost sheet is depressed when pen activity resumes, whereby a voltage across the resistor signifies that pen activity has resumed.

8. The circuit of claim 7 wherein the resistor is connected between the second voltage source terminal and the switch means (31) for connecting the second terminal of the voltage source to one of the sheets, whereby the resistor is isolated from the sheets during normal operation when the switch means (31) is open.

9. The circuit of claim 7 wherein the switch means for connecting the second terminal of the voltage source to one of the sheets (R2) comprises a switch (31) connected between the first sheet (R2) and the resistor (33).

10. The circuit of claim 6 wherein the means for detecting includes a level detect logic circuit (36) connected to a node (34) where the resistor and the switch are interconnected.

11. A method for operating a digitizing tablet, comprising the steps of:

providing a power supply, two resistive sheets (R1, R2), a switching means for connecting the resistive sheets alternately to the power supply for producing analog position signals, and a signal processing means comprising a capture circuit connected to an analog-to-digitial converter connected to a processor, wherein said signal processing means produces digital position signals from the analog position signals;

upon detecting contact of said digitizing tablet by an input device, applying at least one sequence of signals ($\phi 1$, $\phi 2$) for controlling the switching means to alternately apply power to each of the resistive sheets for producing said analog position signals for each dimension of the digitizing tablet; and applying said power to the resistive sheets only long enough for said capture circuit to capture the analog position, and then removing power from the resistive sheets, while the analog to digital converter produces the digital position signals.

12. The method of claim 11 wherein said capture of the analog position is accomplished by sampling and holding the analog position signals.

13. The method of claim 11 wherein said capture of the analog position is accomplished by tracking and holding the analog positing signals.

14. The method of claim 11 wherein power is removed from said signal processing means after a period of inactivity of said input device, to conserve power.

* * * * *

UNITED STATES PATENT AND TRADEMARK OFFICE
CERTIFICATE OF CORRECTION

PATENT NO. : 5,909,382
DATED : 06/01/99
INVENTOR(S) : Chong Lim Neoh

It is certified that error appears in the above-identified patent and that said Letters Patent is hereby corrected as shown below:

ON THE TITLE PAGE

Item [75]: delete "CELIS VUI", and replace with --SINGAPORE--; so that the Inventor's name and residence reads; Chong Lim Neoh, Singapore, Singapore.

at (54), delete "IENCONTACT", and replace with --IEN CONTACT--.

Signed and Sealed this

Seventeenth Day of April, 2001

Attest:

NICHOLAS P. GODICI

Attesting Officer    Acting Director of the United States Patent and Trademark Office